United States Patent [19]

Takahashi

[11] Patent Number: 4,965,027
[45] Date of Patent: Oct. 23, 1990

[54] METHOD FOR THE FREEZE-PRESSURE MOLDING OF INORGANIC POWDERS

[75] Inventor: Nobuyuki Takahashi, Saitama, Japan

[73] Assignee: Mitsubishi Corporation, Tokyo, Japan

[21] Appl. No.: 286,366

[22] Filed: Dec. 16, 1988

Related U.S. Application Data

[63] Continuation of Ser. No. 52,757, May 20, 1987, abandoned, which is a continuation of Ser. No. 722,183, Apr. 10, 1985, abandoned.

[30] Foreign Application Priority Data

Apr. 12, 1984 [JP] Japan .................................. 59-73641

[51] Int. Cl.$^5$ .............................................. C04B 35/64
[52] U.S. Cl. ....................................... 264/28; 264/56; 264/63
[58] Field of Search ............................... 264/28, 56, 63

[56] References Cited

U.S. PATENT DOCUMENTS

| | | | |
|---|---|---|---|
| 2,893,102 | 7/1959 | Maxwell et al. | 264/28 |
| 3,330,892 | 7/1967 | Herrmann | 264/63 |
| 3,885,005 | 5/1975 | Downing | 264/28 |
| 4,341,725 | 7/1982 | Weaver | 264/28 |
| 4,428,895 | 1/1984 | Blasch | 264/28 |

FOREIGN PATENT DOCUMENTS 752286 2/1967 Canada ................................. 264/28

| | | | |
|---|---|---|---|
| 0016971 | 10/1980 | European Pat. Off. | 264/28 |
| 8500130 | 1/1985 | World Int. Prop. O. | 264/28 |

*Primary Examiner*—James Derrington
*Attorney, Agent, or Firm*—Michael J. Striker

[57] ABSTRACT

The present invention is concerned with a method of molding inorganic powders, primarily ceramic powders, in which a binder fluid having a specific freezing point, typically water, is added to the powder to be molded to form a mixture, after which a mold having the desired cavity is filled with the said mixture. The mixture is then pressure molded and rapidly cooled, freezing the binder fluid to produce a frozen molded shape, which is then dried to remove the binder fluid and sintered.

The amount of the binder fluid of specific freezing point to be added to the said inorganic powder is the minimum amount that will satisfy the dual demands of flowability during molding and shape retention after the removal of the binder fluid, with from 25 to 50 vol % generally being appropriate. Holding is achieved by injection molding, compression molding or other technique in which pressure is applied to the material in the mold.

The present invention makes possible the easy and economical mass production of sintered products of complex shape, high dimensional accuracy, and high density using inorganic material.

5 Claims, 5 Drawing Sheets

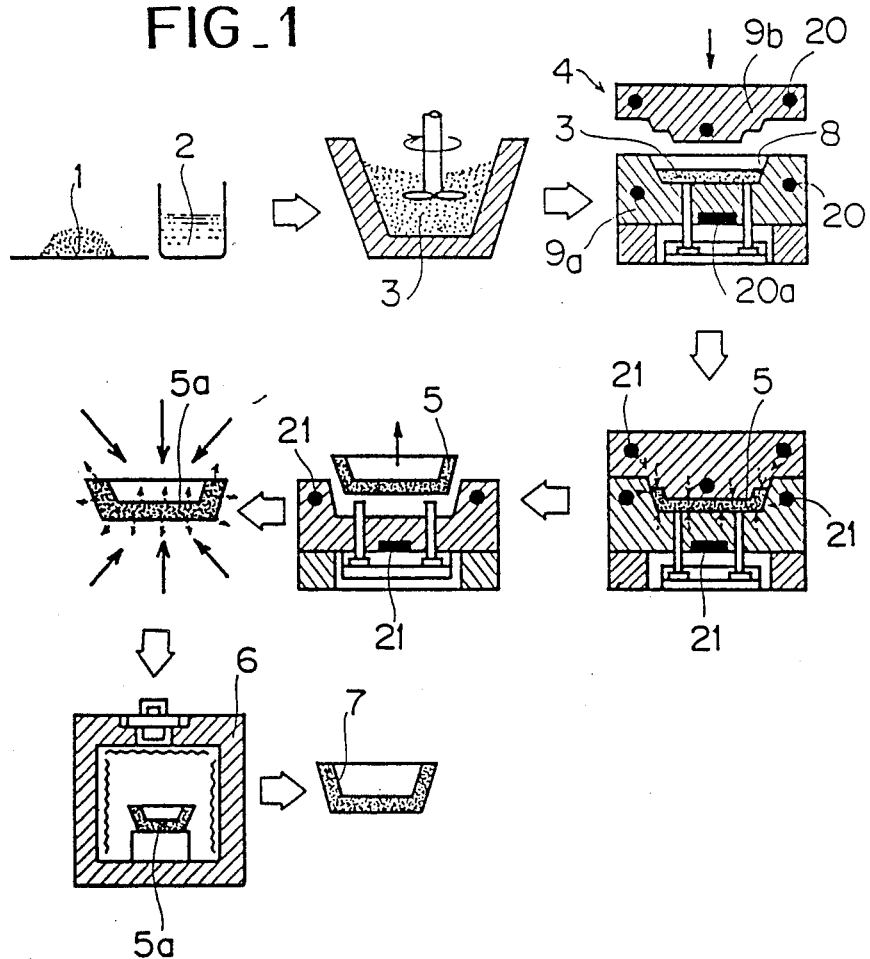
FIG_1

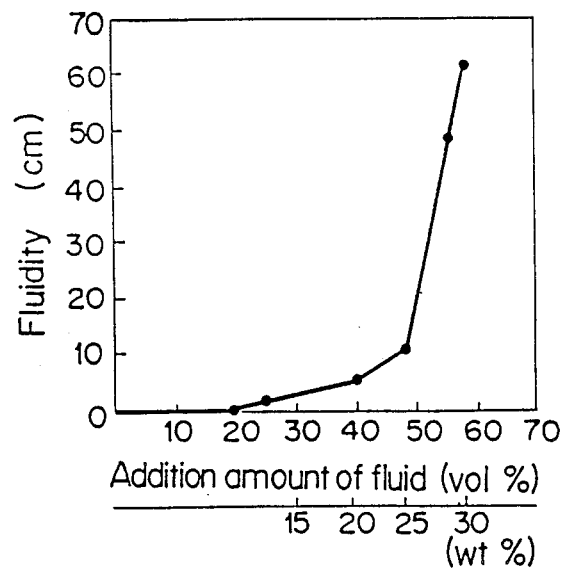
FIG_2

FIG_3(a)
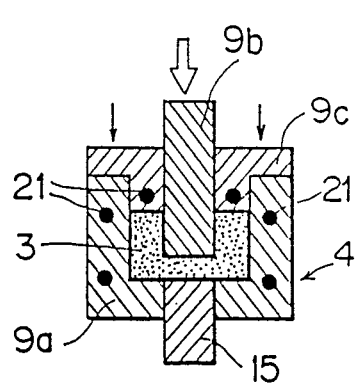
FIG_3(b)
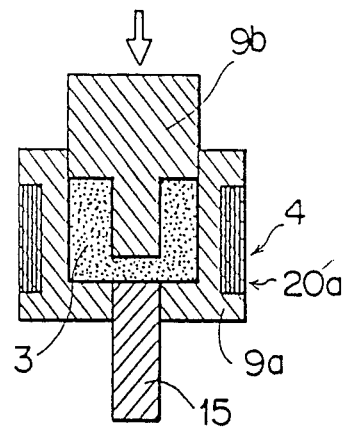
FIG_4
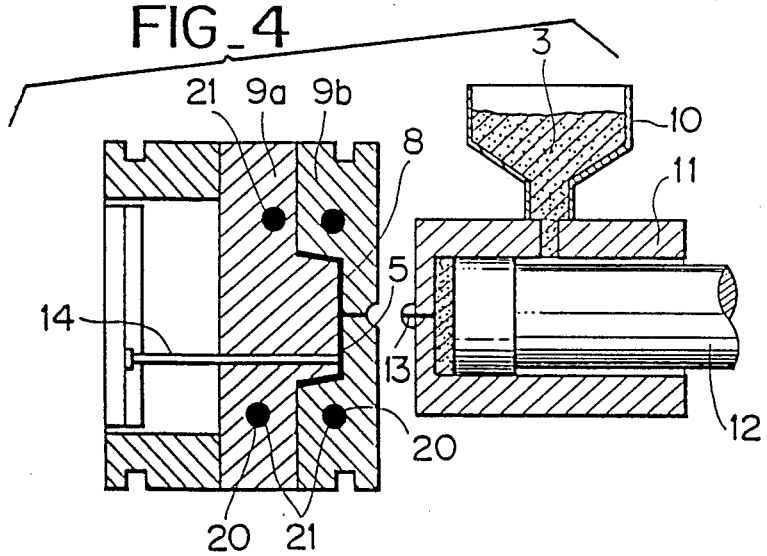
FIG_5(a)
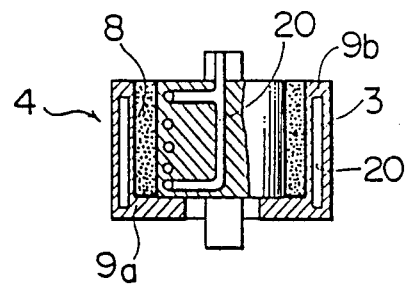
FIG_5(b)
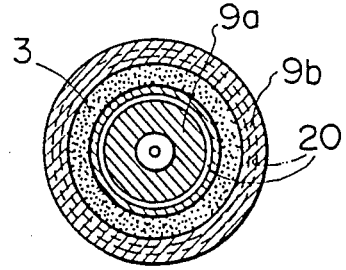

FIG._6(a)
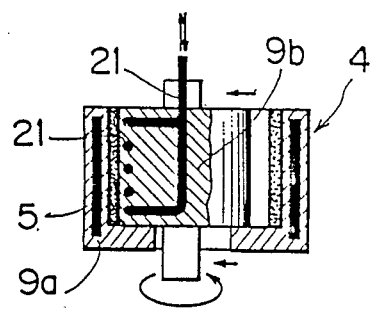
FIG._6(b)
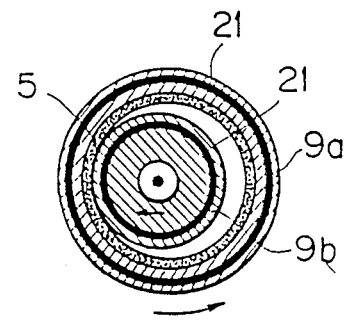
FIG._7(a)
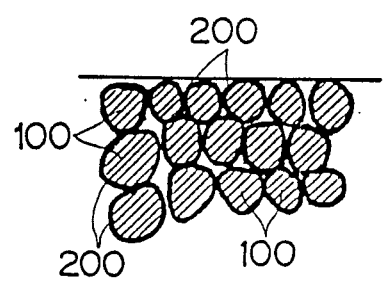
FIG._7(b)
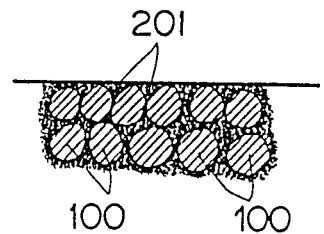
FIG._8
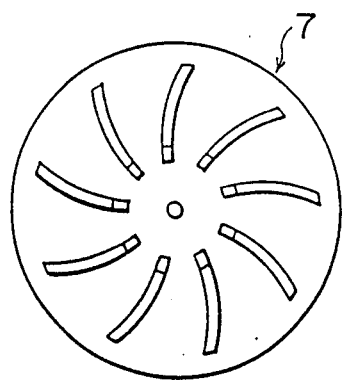
FIG._9
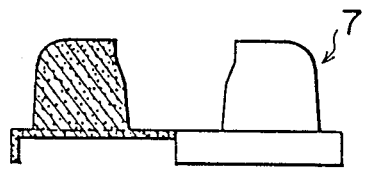
FIG._11
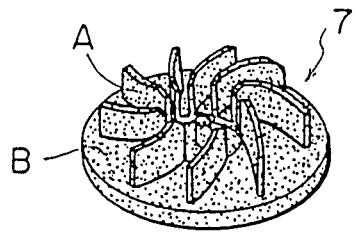

FIG_10
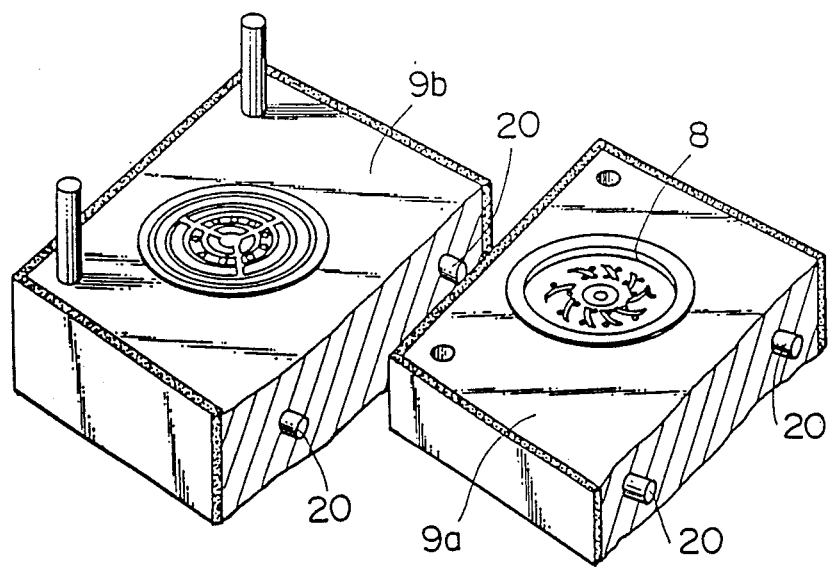
FIG_12
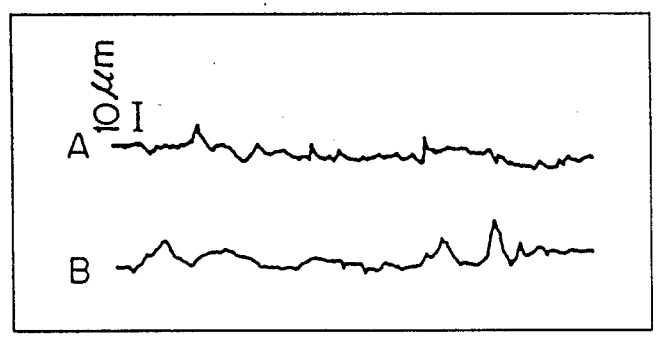

METHOD FOR THE FREEZE-PRESSURE MOLDING OF INORGANIC POWDERS

This is a continuation of application Ser. No. 052,757, filed May 20, 1987 now abandoned, which is in turn a continuation of application Ser. No. 722,183 filed Apr. 10, 1985, now abandoned.

BACKGROUND OF THE INVENTION

The present invention is concerned with molding, specifically by a technique employing freezing and pressure, of inorganic powders, typically ceramics.

Inorganic materials, notably ceramics are recently establishing a position of importance as industrial materials second only to metals and plastics. Particularly in engineering applications, new ceramics and fine ceramics, because of their advantages over metallic materials in terms of lightness, greater hardness and wear resistance, and thermal resistance, are rapidly finding new markets and uses. Applications are anticipated as sliding components or components exposed to high temperatures.

To deliver adequate performance, such mechanical components must generally have a complex, configuration, plus high dimensional accuracy. Ceramics, however, because of their resistance to heat and wear, are a classically unsuited to machining, so that it is highly desirable that the final form should be provided at the time of molding by means of a ceramic powder molding technique.

One such technique is slip casting, which is used traditionally in the field of ceramic ware. This is in effect a casting method in which slip is poured into a plaster of Paris mold, which absorbs the water. It is, however, generally limited to the molding of comparatively simple shapes, and suffers from three disadvantages: (1) large numbers of plaster of Paris molds must be provided; (2) because the molds react with the water and begin to dissolve, mold life is extremely short; and (3) drying requires long periods of time, reducing productivity.

Injection molding is eagerly awaited as an alternative method of molding ceramic powders. If this method can be appropriately applied, it will become possible to produce ceramic products of complex configuration with a high degree of efficiency.

Ceramic powder by itself, however, is not fluid, so that molding it has traditionally required the admixture of large amounts of resin binder. Thus the product is actually plastic, with a high ceramic content.

This led to the following problems:
1. If dewaxing (the removal of the resin binder by heating and decomposing into gas prior to sintering) is carried out too precipitously, scaling and deformation occur. To avoid this, the rate of temperature rise must be reduced and high temperatures cannot be used. As a result, the process of removing the binder requires an inordinate amount of time (from 4 to 7 days), productivity is reduced, and vast amounts of heat are required, leading to higher production costs.
2. If the resin binder is totally removed by this process, strength decreases, so that a portion of the binder must be left in place. After final sintering, the binder residue produces defects in terms of strength.
3. When a resin binder is used, it is mixed with the ceramic powder, heated, and injected into the mold. Since, however, the viscous resistance of the binder is greater, the behavior of the binder when flowing gives rise to uneven distribution of the powder in the molded object, which tends to manifest itself after sintering as product defects. In places where the resin binder flows readily, the powder density is lessened, while it becomes correspondingly greater in the corners. Furthermore, the resin may be concentrated along the weld line (the flow front of the mixture) so that a resin binder layer is present on the surface leading to increased surface roughness after sintering.
4. If the amount of resin binder is reduced, molding parameters such as the pressure and temperature of injection become more critical and harder to control.

Another feasible method might be compression molding using metal dies, but subsequent release from the die is then difficult, and using knockout or ejection pins will result in deformation. It is still necessary, therefore, to use large amounts of resin binder, taking advantage of its flowability and setting properties, and here again the same problems as in the case of injection molding are encountered.

BRIEF DESCRIPTION OF THE INVENTION

The present invention is an attempt at overcoming the problems enumerated above.

Its primary object is to make possible the easy and efficient mass production of ceramic products having complex shapes, high dimensional accuracy, and high density.

Another object of the present invention is to eliminate the time-consuming process of dewaxing involved in the conventional method of injection molding of ceramic powders, and to effect a major improvement in the simplicity and productivity of the process.

Another object of the present invention is to produce ceramic products having outstanding characteristics as mechanical components, which have uniform distribution of powder density throughout the molded object, are free of the problems associated with the use of resin binders—including weld lines, reduced strength due to binder residues, and the surface binder layer—and have extremely good surface roughness.

Another object of the present invention is to enable runners, burrs and other scrap to be recycled directly into feedstock for improved yield.

Another object of the present invention is to offer a high degree of freedom in the choice of molding method, allowing products of complex configurations containing slits to be molded easily, even by means of the simple compression molding process, and when applied to injection molding, to dispense with screws and thus eliminate worries over screw wear and remove the need for screw assembly temperature control and control of heating times.

Another object of the present invention is to significantly reduce binder cost and eliminate environmental or pollution problems.

In order to achieve the abovementioned objects, the present inventor has conducted repeated experiments, and has provided an alternative to the conventional concept, which holds that the setting of an object molded from ceramic powder requires that the particles of powder be brought into mechanical bonding by means of an adhesive substance. By taking advantage of the properties of fluids such as water, that have a specific and easily attainable freezing point—namely that they flow readily at normal temperature, can be made to freeze at reduced temperature, and will sublimate—the present invention makes possible the molding of the target configuration either wholly without resin-based binders.

That is to say, the distinctive features of the present invention lie in molding inorganic powders (primarily ceramic powders); in adding a binder fluid with a specific freezing point (typically water) to the ceramic powder to be molded to form a mixture; in then filling a die having the desired cavities with the said mixture and rapidly cooling the molded mixture so that the binder fluid contained freezes; in then drying the frozen molded shape so that the frozen binder sublimates; followed by sintering.

The main problems in ceramic powder molding are flowability and the strength of the molded shape. If flowability is inadequate, the powder will not penetrate to the very edges of dies having complex configurations. Since molded objects having complex configurations are normally released from the die using pins, they will be deformed unless their strength (shape retention) properties are adequate. Thus it has traditionally been considered essential to use heat to fuse and set the binder.

In contrast, the present invention proposes that a fluid with a specific freezing point be used as the binder. If, advantageously, the binder fluid is water, it forms an extremely thin coating around the particles of powder. Because of the low viscous resistance of this coating, even a small amount of water reduces the values of particle-to-particle and particle-die surface friction resistance, thereby greatly increasing the flowability of the powder. On the other hand, the low viscosity of the water means that bonding power is degraded, so that the shape retention characteristics of the molded object will be inadequate. However water freezes when cooled and the ice crystals bond the particles of powder, with the result that the molded object hardens in the same configuration in which it was molded, with sufficient shape retention strength for die release.

Furthermore, since water sublimates, the binder can be removed easily and in a short time. And since the molded object has been subjected to pressure in the die, it does not crumble, but retains its as-molded shape well, even when the binder is removed. Also, in addition to being pressure molded, binder viscosity is low, with the result that the density of the molded object is high and material distribution is uniform. What is more, the surface of the molded object is extremely smooth

BRIEF DESCRIPTION OF THE DRAWINGS

FIG. 1 is an explanatory view showing the fundamental process for the freeze-pressure molding method that is the subject of the present invention, FIG. 2 is a graph showing the relationship between the amount of the binder fluid with a specific freezing point added to and mixed with the ceramic particles, and the flowability of the mixture, FIG. 3a and FIG. 3b are cross sectional views showing the molding conditions when the compression molding method is used, FIG. 4 is a cross sectional view showing the molding conditions when the injection molding method is used, FIG. 5a, FIG. 5b, FIG. 6a and FIG. 6b are cross sectional views showing the molding conditions when the ring molding method is used, FIG. 7a and FIG. 7b are typical magnified representations of the molded state in the present invention.

FIG. 8 is a plan view showing a prototype made using the present invention,

FIG. 9 shows a half cross sectional view of the same,

FIG. 10 is a perspective view showing the die for the prototype shown in FIG. 8 and FIG. 9, FIG. 11 is a perspective view showing an object molded in accordance with the present invention after sintering, and FIG. 12 is a graph showing the surface roughness of the object shown in FIG. 11.

DETAILED DESCRIPTION OF THE INVENTION

The following is a specific description of the present invention based on the accompanying figures.

FIG. 1 shows the freeze-pressure molding method that is the subject of the present invention in process order, namely:

I A process in which, to an inorganic powder feedstock (1), is added a binder fluid having a specific freezing point (2), to form a mixture (3) capable of providing the required flowability and shape retention after molding.

II A process in which the mixture (3) is introduced into a molding means (4) and subjected to pressure molding it into the desired shape, which is then rapidly cooled to freeze the binder fluid (2) forming a frozen molded object (5a).

III A process in which the frozen molded object (5a) is dried, inserted into a furnace (6), and sintered, forming a sintered object (7).

Specifically, the process in which the mixture (3) is obtained is carried out by placing the powder feedstock (1) from which the object is to be molded in a mixer, adding the binder fluid (2), and mixing until uniform. Mixing should be carried out at room temperature.

Typical of the powder feedstocks used with this invention are ceramic powders. Examples of these are oxides such as $Al_2O_3, \alpha Al_2O_3, 3Al_2O_3 \cdot SiO_2$ or $ZrO_2$, as well as various carbides, nitrides and borides typified by SiC or $Si_3N_4$. The classic ceramics are of course also included.

The aforementioned ceramic powders include those consisting of one or more types of ceramics, as well as other types of powders of which ceramic material is the main constituent.

The powder feedstock (1) should have the smallest possible particle diameter. This has the advantage of resulting in the formation of floc having many points of mutual contact, so that sinterability is excellent, and in addition excellent flowability can be obtained by adding only a little of the binder fluid of specific freezing point (2). Depending on the binder fluid used, we may say that the optimum average particle diameter of the powder feedstock would be 1 $\mu$m or less.

A fluid of specific freezing point (2) is the binder used in the present invention, and it should freeze at a temperature in the vicinity of 0° C. It is desirable that is also be chemically inactive in respect of the powder feedstock (1) or at least not produce deterioration in feedstock quality, and further of sublimating readily when frozen so that no residue is left in the product after sintering.

This binder fluid (2) is selected in accordance with the properties of the powder feedstock (1). When the said feedstock is a ceramic powder, water (including industrial, distilled and deionized) is recommended as the binder because it is low in cost and easy to remove.

Inorganic liquids, or mixtures or compounds of one or more such liquids other than water may also be used as the binder fluid.

Examples of inorganic fluids of specific freezing point include hydrogen peroxide; inorganic acids including sulphuric, hydrochloric and nitric; and ammonia water and other alkalis.

The amount of binder fluid (2) added to the powder feedstock (1) is determined by the need to satisfy three conditions: firstly, that it will impart to the mixture (3) sufficient viscosity that it will penetrate to the farthest corners of the die; secondly, that during rapid cooling, crystals of frozen material will form at least as a shell on the exterior of the molded object adequately binding between the particles; and thirdly, that even when the frozen binder (2) has sublimated, the object will not crumble, but will be able adequately to retain the as-molded shape. Within these limits, the smallest amount possible is best.

The more binder fluid added, the more the flowability of the mixture increases. On the other hand, shape retention during binder sublimation suffers, making it impossible to avoid a drop in the density of the product. Sintering, too, will require an inordinately long time. Conversely, when the amount of binder fluid added is too small, shape retention is good but the flowability of the mixture during molding decreases, and shape and dimensional accuracy deteriorate.

For this reason the present inventor has investigated the relationship between the amount of the binder fluid (2) and flowability. The powder feedstock used was a micropowder of $Al_2O_3$ with an average particle diameter of 0.2 $\mu$m, and the binder fluid was water. In measuring flowability, the swirl-type viscosity test used in investigating flowability in the plastics field was employed, and length of flow was measured. Conditions were room temperature (25° C.), plunger pressure of 210 $kgf/cm^2$, and nozzle diameter of 3.2 mm.

The results of the experiments are shown in FIG. 2. At additive amounts of 20 vol % or less, the flow length was virtually zero. At 25 vol % a flow length of approximately 2.5 cm was obtained, and this increased to 4 cm at 40 vol %, and 10 cm at 48 vol %, until at 58 vol % the flow length increased precipitously.

The admixture of water resulted in the formation of an extremely thin water coating on the surface of the particles. This acted as a binder producing viscosity, and when molding pressure was applied acted as a lubricant producing flowability. In mixing in a mortar, additions of from 25 to 48 vol % yielded a viscous and somewhat dry powder which could be packed into balls by hand. Mixtures of 58% were somewhat creamy, and higher percentages resulted in slurries.

Next, shape retention was investigated. In this experiment, mixtures with binder fluid contents of 25, 30, 35, 40, 50, 55 and 60 vol % were frozen by injection into liquid nitrogen at −7° C. These were then naturally dried and their condition was observed. Mixtures with binder fluid contents of 25-50 vol % retained the as-injected shape, but at 55 and 60 vol %, the shape crumbled.

In addition, the present inventor investigated the relationship between the amount of water added and the flowability and shape retention characteristics, using the abovementioned feedstock powders having average particle diameters of 0.1, 0.5, 0.8, 1 and 2 $\mu$m. The results showed that at average particle diameters of 1 $\mu$m or more, additions of 25-50 vol % produced a situation similar to pouring water into sand, in which the water was drawn into the particle interstices, so that while shape retention was good, flowability did not occur unless the mixture was agitated. This results in poor moldability. This trend holds true when the ceramic powder is SiC, $Si_3N_4$ or $ZrO_2$.

From these results, we may generally say that to obtain the high-precision, high-density molded objects that are the aim of the present invention, the average diameter of the particles of the powder feedstock should be 1 $\mu$m or less, and the amount of the binder fluid added should be approximately 25-50 vol %. Increasing the binder fluid content by approximately 5 vol % makes possible extrusion from the die by pressure during molding, but any further increase results, in addition to the difficulties previously referred to, in the problem of the powder being sluiced away through the die interstices.

In principle, the binder fluid (2) should be added to the powder feedstock (1) in the dry state, but in the case of classic ceramics used for earthenware or porcelain, where the mixture itself already contains moisture, an adjustment should be made in the binder fluid content.

Next is the molding of the mixture (3). In accordance with the present invention, simple casting techniques—like slip casting or casting under reduced pressure or with the addition of agitation—are unsuitable. A method that actively applies a compressive pressure to the mixture (3) must be used.

The reasons for this are, in addition to the need to raise the density of the molded object, to spread the mixture rapidly to the farthest corners of the cavity so that flowability is not impeded by freezing, and to apply pressure in the thickness direction of the molded object, in order to squeeze the fluid to the outer layer of the molded object, and to rapidly form a frozen layer with sufficient strength for mold release.

Specific molding methods include compression molding, injection molding, and ring rolling. In accordance with the present invention, mixing can be adequately accomplished outside the molding machine, so there is virtually no need to repeat the process inside the machine using a screw. Thus complex configurations can be molded with high dimensional accuracy even using the compression molding method, which is relatively free of such problems as weld lines and die stress. In addition, it is also possible to use extrusion molding or roller molding and FIG. 1, FIG. 3a, and FIG. 3b show an actual example of the use of die compression molding, while FIG. 4 shows an actual example of the use of injection molding. FIG. 5a, FIG. 5b, FIG. 6a, and FIG. 6b show an actual example of the use of powder ring molding.

In all these examples, the mixture (3) was introduced into the cavity (8) in lump or tablet form where it was molded by application of pressure to the mixture (3). The die was then opened, and molded object was removed.

In accordance with the present invention, the mixture contains a binder fluid of specific freezing point (2) having lower viscosity than resin binder, and the application of compressive molding pressure results in excellent flowability so that uniform density distribution is achieved to the farthest corners of the cavity.

In the case of FIG. 3a, when one part of the die (9a) is filled with the mixture (3) and the clamping block (9c) is lowered. The opposing part of the die (9b) is then moved so that it exerts a compressive action on the mixture (3). After a period of time, the clamping block (9c) and die (9b) are separated and the molded object is removed using knockout pins (15). In the case of FIG. 3b, molding is accomplished by forcing the stepped die (9b) into the opposing die (9a). If there is excess binder fluid, it will run away through the gaps between the clamping block (9c) and dies (9a) and (9b).

In the case of FIG. 4, the mixture (3) charged in the injection cylinder (11) is injected at a high rate into the cavity (8) by the plunger (12) via nozzle (13), while dies (9a) and (9b) are held together by a clamping device (not shown). After a period of time, dies (9a) and (9b) are opened, and the molded object is removed using the ejector pin (14). In this injection molding technique there is no need for the screw used for mixing when the conventional resin binder is used, or for any means of controlling screw temperature.

In the case of FIG. 5a and 5b, and FIG. 6a and 6b, the cavity (8) is filled with the mixture (3) while the outer die (9a) and the inner die (9b) are positioned concentrically. The outer die (9a) is then rotated relative to the inner die (9b), which is run out until, at the point at which the outer die (9b) and inner die (9a) are in the closest proximity, the mixture (3) is compression molded into a ring. After molding, inner die (9b) and outer die (9a) return to a concentric relationship and the molded object is removed.

Further, in accordance with the present invention, the mixture (3) is fast frozen to below the freezing point of the binder fluid (2) contained in it.

Cooling may be accomplished indirectly through the die walls, or by allowing a coolant to act directly on the mixture or molded object. In either case, cooling must be applied during the molding process. It is not desirable to remove the die from the molding machine and immerse it in the coolant.

In the case of indirect cooling through the die walls, cooling should be begun at or before the point at which the die is filled with the mixture (3), consideration being given to production cycle times. Cooling may also be done by stepwise reduction in the cooling temperature. It is also permissible to begin cooling after the die has been filled with the mixture, molding pressure has been applied, and molding has progressed to a certain degree, although this may lengthen the cycle time.

To cool the mixture (3) in the cavity (8) a means consisting of a duct (20) and evaporator unit (20a) is provided inside die (9a) and/or (9b) and connected to a compressor, condenser, drier, capillary tubes, expansion valve, or other freezer unit (not shown), and the desired coolant—e.g., liquid nitrogen, propane gas, liquid oxygen, or alcohol or oil that has been chilled by a cold substance such as dry ice—is passed through it. The evaporator (20a) can be removed as a unit. In the case of the molding methods shown in FIG. 5 and FIG. 6, the coolant (21) can be sprayed onto the surface of the molded mixture through the interstices of the die.

From the point of view of improving cycle time, it is recommended that the system should be cooled only to a point such that freezing does not begin until after the mixture (3) fills the die. It is also recommended that the die be wrapped in lagging, or the temperature of the area in which the molding equipment is installed by lowered.

In any case, the mixture (3) is subjected to a compressive molding force by dies (9a) and (9b), which brings the powder feedstock particles (100), (100) into contact, as shown in FIG. 7a, thus also bringing into contact the extremely thin films of binder fluid (200). The films are also subjected to pressure, and the fluid squeezed out is brought to the surface region of the molded object. This is then frozen by the coolant forming fine crystals as shown in FIG. 7b. These crystals (201), (201) have a strong mutual bonding force and the feedstock powder particles (100), (100) set (harden) in the as-molded configuration, just as if they were bonded using a conventional resin binder.

It is not necessary that the binder fluid should freeze all the way to the center of the molded object; all that is required is that a sort of shell of a certain thickness be formed to impart sufficient strength to withstand release from the mold. The thickness of the frozen portion can be controlled by choosing a binder fluid having a suitable freezing point, and by regulating the temperature and length of time of cooling.

Even when the die is cooled before being filled with the mixture, no problem is encountered since the mixture flows to the farthest corners of the die before freezing, thanks to the fact that in accordance with the present invention pressure molding is used. Molding pressure is determined by the density and dimensional accuracy required of the molded object being manufactured, but should be in the range of 200–8000 kgf/cm$^2$ for compression molding, and 200–2000 kgf/cm$^2$ for injection molding.

In techniques using a resin binder, flowability is poor at low pressures, but in accordance with the present invention good molding is achieved even at low pressure.

The above process results in a freeze-molded object (5a) being obtained. Dies (9a) and (9b) are then separated, and the freeze-molded object (5a) is removed from dies (9a) and (9b). Since the freeze-molded object (5a) has ample shape retention strength and self-support, this can easily be accomplished using knockout pins, ejector pins, etc., and handling is easy even when the walls of the freeze-molded object are thin.

When water is used as the binder fluid, adhesion to the die as a result of volumetric expansion can easily be avoided by forming a draft in the die. Specifically if an escape is arranged in the direction of die opening, the molded object (5a) will rise spontaneously when clamping pressure is released. Adhesion of the frozen portion to the die can be avoided by adding the correct amount of binder fluid, and if necessary the temperature of the die surface may be raised slightly during release by controlling the supply of coolant (21).

After it has been freed, the freeze-molded object (5a) is dried to remove the frozen binder. This may be done either naturally or by application of heat. Another method that is particularly desirable from the point of view of preventing cracking is vacuum freeze drying. A simpler method is to place the freeze-molded object (5a) in a reduced-pressure cold room. Whichever method is used, no resin binders are used in accordance with the present invention, assuring quick and easy binder removal.

Molded objects that have been dried as described above will possess ample shape retention strength. And since there is no surface binder layer such as is produced when resin binders are used, the surface of the molded object is extremely smooth. In addition density is high, and since the viscous resistance of the binder is low, density distribution is even.

After drying, the molded object is sintered. This may be done under the conditions normally used in sintering objects molded from inorganic powders, and pre-sintering and pressure sintering may be adopted if necessary. Since no resin binder is used, the sintering process is also easy to control. Even in cases where the feedstock powder is $Si_3N_4$ with water added as the binder fluid, no problem is encountered if sintering is done in a reducing atmosphere. In accordance with the present invention, high density can be obtained in the molding process, making possible reductions in sintering time.

Sintering may result in a finished product, or may be followed by any required finishing process. If required, HIP processing may also be applied.

The above processes make it possible to manufacture from inorganic powders molded products that have complex configurations and high dimensional accuracy combined with uniform consistency, high density and smooth surface, making them suitable for machine components.

Specific examples in accordance with the present invention will be listed.

EXAMPLE 1

I A fan-shaped object similar to a turbine blade was made using α-alumina as the powder feedstock and tap water as the binder fluid of specific freezing point. A prototype had the configuration shown in FIG. 8 and FIG. 9. It had nine blades, and a flange outer diameter of 110 mm, blade outer diameter of 94 mm, blade height of 30 mm and blade thickness of 2 mm.

II The average diameter of the feedstock powder particles was 0.2 μm, and the composition was 115 parts by weight (76.7 wt %) of the powder to 50 parts by weight (23.3 wt % or 44.7 vol %), mixed at room temperature to a uniform consistency in a mixer.

Molding was carried out in a vertical injection molding machine with a direct-acting plunger. The dies were of SKD-11 steel, with 50 mm diameter pipes embedded around the cavities in both the upper and lower dies, with provision for the supply of liquid nitrogen at the points where the pipes emerged from the dies.

III Molding conditions were 53.4 tons clamping force and 400 kgf/cm$^2$ injection pressure. After injection, the die was held for approximately 1 min and then cooled rapidly to −13° C. for 1 min. The molded object was released at a die opening rate of 10 mm/sec. Holding was also carried out with the die cooled to −13° C. before injection, and held for 1 min after injection.

In both cases, the molded object was thoroughly frozen, and no crumbling occurred even when removed using ejector pins. These freeze-molded objects were dried naturally for 16 hr, pre-sintered at approximately 900° C. for 60 min, and sintered in a resistance furnace at 1600° C. for 2 hr.

IV The sintered product is as shown in FIG. 11, achieving thin walls and high dimensional accuracy, despite total elimination of resin binders. Density is high, at 3.4 g/cm$^3$, and its distribution was uniform.

EXAMPLE 2

I The prototype product with the configuration shown in FIG. 8 and FIG. 9 was made using $Al_2O_3$ with average particle diameter of 0.3 μm as the powder feedstock and tap water as the binder fluid of specific freezing point. The molding machine was a vertical type, dies were of SKD-11, and both the upper and lower dies were wrapped with lagging. Pipes similar to those used in Example 1 were embedded in the dies, through which liquid nitrogen was passed as coolant.

II Tap water was added to the feedstock powder in a proportion of 42.2 vol % and the two were mixed at room temperature in a mixer. The lower die was then filled with lumps of the The sintered object had high density and excellent dimensional accuracy, and the surface condition was outstanding.

I claim:

1. A method of molding inorganic powders under freeze-pressure to make a freeze-molded product and subsequently a mechanical part from ceramic of high purity, high density and high precision, comprising the steps of using ceramic powders having an average particle diameter of no greater than 1 micrometer in average size, and adding 25 to 50 vol % thereto of an inorganic fluid which freezes tat temperatures of about 0° C. and is easily sublimed after freezing so that said fluid does not remain in a sintered product, and kneading so as to form a thin film of said inorganic fluid on said ceramic powders and to form a mixture; filling said kneaded mixture into a mold having a predetermined cavity, applying compressive pressure of more than 200 kgf/cm$^2$ to said kneaded mixture in said mold and during said applying rapidly cooling said mixture by cooling means provided in said mold; releasing the freeze-molded product from the mold; drying the freeze-molded product after withdrawing from the mold; and sintering it.

2. A method according to claim 1, wherein the cooling of the mixture is accomplished indirectly by passing a coolant through a plurality of passages in said mold.

3. A method according to claim 1, wherein the drying is any one of natural drying, drying under heat and reduced-pressure freeze drying.

4. A method according to claim 1, in which said inorganic fluid is water.

5. A freeze-pressure molding method for inorganic powders as set forth in claim 1, in which said inorganic fluid is an inorganic liquid other than water or a mixture of two or more of said inorganic liquids other than water.

* * * * *